US005731075A

United States Patent [19]
Goto et al.

[11] Patent Number: 5,731,075
[45] Date of Patent: Mar. 24, 1998

[54] COLORANT FOR A TRANSPARENT SUBSTRATE AND METHOD OF MAKING THE COLORANT

[75] Inventors: Kazuo Goto, Higashiosaka; Susumu Murakami, Hyogo; Shigehiko Hayashi, Hyogo; Koichi Sayo, Hyogo; Toru Noguchi, Hyogo; Masayuki Ogino, Akashi; Yoshio Yamaguchi, Hyogo, all of Japan

[73] Assignee: Mitsuboshi Belting Ltd., Kobe, Japan

[21] Appl. No.: 354,752

[22] Filed: Dec. 8, 1994

Related U.S. Application Data

[63] Continuation-in-part of Ser. No. 616,901, Nov. 21, 1990, Pat. No. 5,418,056.

[30] Foreign Application Priority Data

Aug. 31, 1994 [JP] Japan .................... 6-232338

[51] Int. Cl.$^6$ ........................ B32B 5/16
[52] U.S. Cl. ................ 428/323; 428/327; 428/328; 428/329; 428/330; 428/331; 428/402; 428/407; 428/430; 428/435; 428/446; 428/452; 428/704; 428/913
[58] Field of Search .................. 428/323, 331, 428/327, 426, 402, 328, 329, 330, 407, 446, 704, 430, 435, 438, 441, 452, 480, 473.5, 474.4, 500, 532, 913; 524/35; 106/1.05, 400, 401; 252/582, 586

[56] References Cited

U.S. PATENT DOCUMENTS

| | | | |
|---|---|---|---|
| 2,947,646 | 8/1960 | Devaney et al. ............ 106/1.19 |
| 3,082,109 | 3/1963 | Devaney et al. ............ 106/1.22 |
| 3,692,731 | 9/1972 | McAdow .................... 428/323 X |
| 3,857,798 | 12/1974 | Wall et al. .................. 252/514 |
| 4,025,665 | 5/1977 | Hannon ..................... 427/192 |
| 4,328,299 | 5/1982 | Beall et al. ................. 430/13 |
| 4,579,594 | 4/1986 | Nanao et al. .............. 106/287.24 |
| 4,615,903 | 10/1986 | Miller ......................... 427/473 |
| 4,654,229 | 3/1987 | Morita et al. ............... 427/180 |
| 4,714,631 | 12/1987 | Aufderheide ............... 427/250 |
| 4,720,401 | 1/1988 | Ho et al. .................... 427/250 |
| 4,842,832 | 6/1989 | Inoue et al. ................. 423/21.1 |
| 4,889,746 | 12/1989 | Utsumi et al. .............. 427/162 |
| 4,913,845 | 4/1990 | Gillberg-LaForce et al. ..... 252/582 |
| 4,983,456 | 1/1991 | Iwaskow et al. ............ 428/254 |
| 5,045,402 | 9/1991 | Adams, Jr. et al. ........ 428/545 |
| 5,093,286 | 3/1992 | Nogami et al. ............. 501/17 |
| 5,110,505 | 5/1992 | Herron et al. .............. 252/518 |
| 5,231,533 | 7/1993 | Gonokami et al. ......... 359/328 |
| 5,261,955 | 11/1993 | Nadkarni .................... 106/404 |
| 5,279,868 | 1/1994 | Ohtsuka et al. ............ 427/586 |
| 5,296,189 | 3/1994 | Kang et al. ................. 419/9 |
| 5,371,122 | 12/1994 | Kawahara et al. ......... 524/88 |
| 5,418,056 | 5/1995 | Noguchi et al. ............ 428/323 |

FOREIGN PATENT DOCUMENTS

| | | |
|---|---|---|
| 0125617 | 5/1984 | European Pat. Off. . |
| 0318196 | 11/1988 | European Pat. Off. . |
| 0495459 | 7/1992 | European Pat. Off. . |
| 4133370 | 4/1993 | Germany . |
| 232338 | 8/1994 | Japan . |
| 90/11890 | 10/1990 | WIPO . |
| 92/16571 | 10/1992 | WIPO . |

OTHER PUBLICATIONS

Noguchi et al., "Novel method to disperse ultrafine metal particles into polymer", *Journal of Materials Science Letters*, 10 (1991), pp. 477–479.

Noguchi et al., "New technique to produce Au/Mo$_x$ (M=Ti or Al) glass composite containing Au microcrystals at high concentration", *Applied Physics Letters*, 12 Apr. 1993, No. 15, New York.

Kashiwagi et al., "Organic films containing metal prepared by plasma polymerization", *Dept. of Electrical Eng.*, Toyo University, Kawagoe Saitama, Japan, accepted May 1, 1987.

*Primary Examiner*—H. Thi Le
*Attorney, Agent, or Firm*—Wood, Phillips, VanSanten, Clark & Mortimer

[57] ABSTRACT

A colorant of ultrafine particles for providing transparent color includes ultrafine metal particles, a fixing agent and a glass forming material. The ultrafine metal particles can be gas condensed ultrafine metal particles or polymer compound ultrafine metal particles. The colorant produces a transparent colored film on a substrate.

18 Claims, No Drawings

COLORANT FOR A TRANSPARENT SUBSTRATE AND METHOD OF MAKING THE COLORANT

CROSS-REFERENCE TO RELATED APPLICATION

This is a continuation-in-part of U.S. application Ser. No. 07/616,901 to Noguchi et al. filed on Nov. 21, 1990, now U.S. Pat. No. 5,418,056.

TECHNICAL FIELD

This invention generally relates to colorants for transparent substrates. More particularly, the invention relates to a colorant for glass that produces a transparent and bright colored film that has high mechanical strength and chemical resistance. The invention is also directed to a method of making the colorant.

BACKGROUND OF THE INVENTION

Glass plates are colored by applying thereon a mixture of glass powder and a color additive, i.e., a pigment, and then heating the printed glass plate to develop color. This method provides freedom of design. However, the interface between the fused glass powder generates intensive light scattering and results in an opaque coloring of the glass. Therefore, this method is not suitable for providing a transparent color.

Two alternative methods that have been developed to overcome the problems associated with using a mixture of glass powder and color additive are the ion exchange method and the sputtering method. In the ion exchange method, an inorganic silver or copper salt is applied to the surface of the glass plate. The glass plate is then exposed to an elevated temperature to melt or decompose the salt. Silver ions ($Ag^+$) or copper ions ($Cu^+$) penetrate into the glass plate and are reduced to metal particles. The metal particles generate a transparent colloidal color. It is difficult to generate ultrafine particles for some inorganic salts using the ion exchange method. Also, with the ion exchange method there is a poor color selection.

The sputtering method deposits a metallic film on the glass plate. Problems associated with the sputtering method include difficulty in controlling the particle size of the metallic particles, insufficient metallic film strength and the requirement of large equipment that is inadequate for commercial production.

A colorant and method that permits coloring a transparent substrate with a brightly colored film that has high mechanical strength and resistance to chemicals is highly desirable.

SUMMARY OF THE INVENTION

A colorant for providing a transparent colored film to a substrate includes ultrafine metal particles, a fixing agent and a glass matrix forming material. The ultrafine particles can be in a polymer compound that includes the ultrafine metal particles and a polymer.

The colorant is applied to a transparent substrate such as glass and provides freedom in designing the printed pattern. When exposed to an elevated temperature, the colorant produces a transparent colored film that exhibits minimal light scattering. The colored film has good mechanical strength and chemical resistance.

Numerous other advantages and features of the present invention will become readily apparent from the following detailed description of the preferred embodiments and the appended claims.

DETAILED DESCRIPTION OF THE PREFERRED EMBODIMENTS

A colorant for providing a transparent colored film includes: ultrafine metal particles; a fixing agent; and a glass matrix forming material. The ultrafine metal particles can be in a polymer compound in a composite or composition that includes the ultrafine metal particles and a polymer. Preferably the colorant also includes a binder resin. The colorant can be used to print on a transparent substrate.

The polymer compound includes the ultrafine metal particles dispersed in the polymer. The ultrafine metal particles are dispersed in the polymer without coagulation of the metal particles. The polymer compound can be produced by preparing ultrafine particles using a melt and immediate quench method, a vacuum vapor deposition method, a vapor phase method, a liquid phase method (which is also referred to as a precipitation method), a solid phase method or a dispersion method, followed by mechanical mixing of the ultrafine particles with a solution or melt of the polymer.

The ultrafine metal particles can be produced by a gas condensation method, i.e., gas condensed ultrafine metal particles, in which case they are not in the polymer.

Two methods that take advantage of the properties of a polymer layer in a thermodynamically nonequilibrated state to disperse a layer of metal thereon and produce ultrafine metal particles are the melt and immediately quench method and vacuum vapor deposition method. In both of these methods, a metal layer is applied to the polymer layer in the nonequilibrated state by adhering a metal foil or plate onto the polymer layer or by vacuum deposition.

In the melt and immediate quenching method, the polymer is melted and immediately immersed while in the molten state in a bath of liquid nitrogen or the like for rapid cooling and solidification. Within the bath is a base upon which the polymer layer solidifies. The molten polymer is cooled at a rate at or above the critical cooling temperature for the polymer. A polymer layer in a thermodynamically nonequilibrated state is produced.

In the vacuum vapor deposition method, a known vacuum evaporator is used. Pellets of the polymer are placed in the vacuum evaporator, the pressure within the vacuum evaporator is reduced into a range of $1\times10^{-4}$ to $1\times10^{-6}$ Torr and the polymer pellets are melted and evaporated to produce a polymer layer on a base. The evaporation rate of the polymer is about 0.1 to about 100 micrometers per minute ($\mu m/min$), preferably about 0.5 to about 5 $\mu m/min$. The polymer layer is in a thermodynamically nonequilibrated state. To apply the metal layer to the polymer layer, a piece of metal is placed in the vacuum evaporator, the pressure within the vacuum evaporator is reduced into the range of $1\times10^{-4}$ Torr to $1\times10^{-6}$ Torr and the metal wire is melted and evaporated.

The polymer layer in a thermodynamically nonequilibrated state having the metal layer thereon is then relaxed and thereby changed to a thermodynamically equilibrated state. Relaxation generates ultrafine particles of the metal of the metal layer that penetrate by diffusion into the polymer layer until the polymer layer is completely relaxed and is in a thermodynamically equilibrated state. During relaxation the metal layer decreases in thickness until it disappears. The ultrafine particles are uniformly distributed in the polymer layer without coagulating.

Relaxation can be achieved by maintaining the polymer layer having the metal layer thereon at ambient temperature, i.e., a temperature in the range of about 20° to about 30° C., or by heating to a temperature in the range of the glass transition temperature and the melting temperature of the polymer. Preferably, the polymer layer is maintained at a temperature below the melting temperature of the polymer in an isothermal water bath or oven which promotes relaxation.

In the gas condensation method, the metal for the ultrafine metal particles is vaporized in a chamber while introducing an inert gas, e.g., helium gas, thereto. The vaporized metal impinges the inert gas to cool and condense the ultrafine metal particles. During the period when the metal particles are still in an isolated state, an organic solvent vapor is introduced into the chamber to coat the particle surface. This method is disclosed in Unexamined Japanese Patent Publication No. 34211-1991.

The ultrafine particles have a particle size of less than about 1000 nanometers (nm), preferably less than about 300 nm and most preferably less than about 100 nm. Heating the polymer layer to a temperature in the range of about the glass transition temperature to about the melting temperature of the polymer promotes formation of ultrafine metal particles having a particle size less than about 100 nm and a peak particle size distribution in the range of about 1 to about 10 nm.

The ultrafine metal particles produced using the gas condensation method preferably have a particle size of less than 10 nm.

The ultrafine metal particles in the polymer layer in a thermodynamically equilibrated state are present in an amount in the range about 0.01 to about 80 weight percent (wt %) and the polymer is present in an amount in the range of about 20 to about 99.99 wt %, the wt %s being based on the total weight of the polymer compound. The amount of ultrafine metal particles is adjustable by changing the thickness of the polymer layer in a thermodynamically nonequilibrated state and changing the thickness of the metal layer.

The polymer is a conventional thermoplastic polymer. Representative polymers include high density polyethylenes, low density polyethylenes, poly(vinylidene fluorides), poly(vinyl chlorides), polyoxymethylenes, nylon-6, nylon-66, nylon-11, nylon-12, nylon-69, polyethylene terephthalate (PET), polyvinyl alcohol, polyphenylene sulfide (PPS), polystyrene (PS), polycarbonate, polymethylmethacrylate and the like. The polymer preferably has a molecular cohesive energy density of at least about 2000 calories per mole. The molecular cohesive energy density is described in detail at page 890 of the Chemical Handbook Application Edition (1974) issued by the Japanese Chemistry Academy as follows:

COHESIVE ENERGY DENSITY

Cohesive energy density: Plastics in general are not crystalline polymers as suggested by the fact that they were called synthetic resins because of their resemblance to pine resin when they appeared for the first time. However, not all plastics are amorphous; many of them are partly crystalline. Polymeric substances may be arranged in the order of their cohesive energy density. Those having a low value are elastomers, those having a medium value are plastics, and those having a high value are fibers. With a higher cohesive energy density, plastics crystallize more readily, show an increase in melting point, and exhibit the properties of fibers. Rubbery substances have a low cohesive energy density and their melting point is usually lower than the working temperature.

In classifying polymeric substances into rubbers, plastics, and fibers, one draws on their properties which vary depending on temperature. They may be classified as follows according to their working temperature.

Rubbers:

$$T_g < \text{working temperature}$$

Flexible plastics:

$$\text{softening point} > \text{working temperature} > T_g$$

Rigid Plastics:

$$T_m > T_g > \text{working temperature}$$

Fibers:

$$T_m > \text{working temperature}$$

Having $T_g$ higher than room temperature, rigid plastics are frozen and solid at room temperature. At temperatures above $T_m$, they become fluid and exhibit plasticity and hence they are capable of molding. When solidified, they exhibit the properties of plastics owing to increased cohesive energy and restrained molecular motion. They become fibers if they undergo stretching which orients molecules. Fibers have a greater cohesive energy density and intermolecular force than plastics.

As mentioned above, the properties of plastics may be distinguished by the glass transition point ($T_g$) and the melting point ($T_m$). In generally, $T_m$ is related by heat of fusion ($\Delta H_m$) and entropy of fusion ($\Delta S_m$) as follows:

$$T_m = \Delta H_m / \Delta S_m$$

$\Delta H_m$ is the difference between the internal energies of crystalline and amorphous fractions. It is expressed in terms of cohesive energy due to intermolecular force. $\Delta S_m$ is the difference between the entropies of crystalline molecules and amorphous molecules. If it is desirable to have a low $T_m$ (as in the case of rubber), the object is achieved by lowering $\Delta H_m$ or increasing $\Delta S_m$.

The fact that polyethylene exhibits high plasticity despite its small cohesive energy is presumably due to its symmetric molecular structure and its strong tendency toward crystallization which leads to a small $\Delta S_m$.

Returning now to the colorant on the present invention, the metal of the metal layer or ultrafine metal particles is at least one metal selected from the group on noble metals, e.g., gold, platinum, palladium, rhodium and silver, and metals selected from the group of titanium, vanadium, chromium, manganese, iron, nickel, copper, zinc, cadmium, yttrium, tungsten, tin, germanium, indium and gallium.

The polymer compound is mixed with a solvent to produce a polymer compound solution having uniformly dispersed ultrafine metal particles. Because the ultrafine metal particles have a very small particle diameter and because there is an interaction between the particles and the polymers, there is no precipitation nor coagulation of the ultrafine particles and no separation of the ultrafine particles from the polymer.

The fixing agent of the colorant is an organic metal compound. Upon exposure to an elevated temperature, the fixing agent becomes an amorphous inorganic material having the structure $MO_x$ wherein M is a metal element selected from the group of aluminum, silicon, titanium, chromium, manganese, iron, cobalt, nickel, copper, yttrium, zirconium, niobium, indium, tin, antimony and the like and x is a number in the range of about 0.1 to about 3. The inorganic material having the structure $MO_x$ fixes the ultrafine particles in the colored film.

The selection of the fixing agent influences the color obtained using the colorant. For example, when the colorant contains both ultrafine gold particles and one of the following organic metal compounds as the fixing agent, the resultant color is achieved: an organic metal compound containing silicon produces a red color; an organic metal compound containing copper yields a pink color; an organic metal compound containing titanium produces a blue color; an organic metal compound containing iron produces a green color; an organic metal compound containing cobalt produces a grey color; an organic metal compound containing zirconium produces a blue color; and an organic metal compound containing nickel produces a blue color.

Representative organic groups of the fixing agent include alcoxides, e.g., ethoxide and propoxide; organic acid salts, e.g., naphthenate and acetate; and organic complex salts, e.g., β-diketone salt and oxine salt.

Representative metals of the fixing agent include aluminum, silicon, titanium, chromium, manganese, iron, cobalt, nickel, copper, yttrium, zirconium, niobium, indium, tin, antimony and the like The colorant also includes a glass matrix forming material that increases the strength and the chemical durability of the colored film. The glass matrix forming material is an organic compound that contains an element selected from the group of silicon, boron and phosphorus.

Upon exposure to the elevated temperature, the glass matrix forming material forms a glass matrix having the empirical structual formula $M'O_y$, wherein M' is an element selected from the group of silicon, boron and phosphorus and y is a number in the range of about 0.1 to about 3.

Representative glass matrix forming material are tetra 1-propoxy silane, silicone oil, triethyl borate, tristearyl borate, triphenyl borate, tricresyl phosphate, triphenol phosphate, iproniazid phosphate, diphenol phosphate, phosphono acetate, phosphoramidone, di-n-butyl phosphate, triethyl phosphate and tri-n-amyl phosphate.

The colorant can also include a binder resin that maintains the viscosity of the colorant at a level sufficient to permit easy handling during printing and to maintain the strength of the dried colorant layer applied to the substrate for printing. The binder resin must dissolve in the organic solvent. Preferably, the binder resin decomposes at a low temperature.

Representative binder resins include: cellulose, e.g., nitrocellulose, ethyl cellulose, cellulose acetate and butyl cellulose; polyacrylic compounds, e.g., polyacrylates and polymethylacrylates; polyamides, e.g. , nylon-6, nylon-11 and nylon-12; polyesters, e.g. , polyethylene terephthalate and polycaprolactone; polyethers, e.g., polyoxymethylene; polycarbonates; and polyvinyl compounds, e.g., polystyrene, polybutadiene and polyisobutylene.

The colorant also includes an organic solvent. To facilitate printing with the colorant on the substrate, the organic solvent preferably has a relatively high boiling point.

Representative organic solvents are methacresol, dimethylformamide, carbitol, α-terepineol, diacetone alcohol, triethylene glycol, paraxylene and the like.

The colorant preferably contains a molar ratio of the fixing agent to the ultrafine metal particles of at least about 0.1:1.

The colorant preferably contains the glass matrix forming material in a molar ratio of glass matrix forming material to fixing agent in the range of about 0.1:1 to about 1000:1.

The organic solvent is used in an amount effective to provide the colorant with a consistency suitable for printing on the substrate. Preferably, the colorant has the consistency of paste.

The viscosity of the colorant is preferably in the range of about 50 to about 5000 centipoise.

The colorant is prepared by mixing the polymer compound, fixing agent, glass matrix forming material, binder resin and organic solvent in any order in a suitable vessel. Separate solutions of the polymer compound, fixing agent, glass matrix and binder resin can be prepared using the organic solvent prior to admixing the solutions.

Representative transparent substrates include glass and polymers that can withstand the temperatures required to react the colorant to produce the transparent colored film.

The colorant is used to print on the substrate using a conventional screen printing method. In this method, the surface of the substrate to be printed on is placed beneath a horizontally positioned screen with the distance between the surface and the screen being several millimeters. A representative screen is a polyester plain woven fabric having 255 mesh openings per square inch. The colorant is placed on the screen and spread over the entire surface of the screen using a squeegee without contacting the screen to the substrate surface. The squeegee is then moved across the screen surface to press the screen against the substrate surface. The colorant passes through the openings and is deposited on the substrate surface. Some of the mesh openings can be closed to prohibit colorant from passing therethrough and help create designs of colorant on the glass. The procedure can be repeated using the same or a different screen.

After the printing is completed, the printed substrate is exposed to a temperature in the range of about 100° to 200° C. in the presence of air for a time period of about ten minutes to remove the organic solvent. Alternatively, the printed substrate is dried in a closed vessel at a reduced pressure.

The dried printed substrate is then exposed to an elevated temperature in the range of about 300° to about 800° C. for a time period effective to produce the transparent colored film. The ultrafine metal particles comprise up to about 90 mole percent of the colored film.

It is presently theorized that the composition of the colored film includes ultrafine metal particles, and amorphous inorganic material having the structure $MO_x$ as the second component and a glass matrix having the structure $M'O_y$ as the third component wherein M, x, M' and y are as described above in connection with the fixing agent and glassy matrix forming material, respectfully.

The colored film is a glassy oxide including the fixing agent for the ultrafine metal particles. For example, due to the interaction with the aluminum oxide (Al—O—) or titanium oxide (Ti—O—), the ultrafine metal particles are not coagulated with each other and do not grow into coarse particles but rather are affixed in the colored film. The surrounding Al—O— or Ti—O— is not freely crystallized due to the interaction with the ultrafine particles and forms an amorphous glass that becomes the main component of the colored film to allow good light transmission.

The colored film also exhibits good mechanical strength and chemical resistance. The color shade of the reacted colorant can be controlled by changing the content of the ultrafine particles.

Colorants and comparative coloring materials were prepared in accordance with the examples and comparative examples given below. Colored films and comparative films produced from the colorants and comparative coloring materials, respectfully, were subjected to the tests that are described below. The test results are also provided below.

1. State of the Metal Particles, Color Films and Comparative Films

Since the metal is a crystal, X-ray diffraction was used to determine the state of the metal particles in the colored film and in the comparative films. The X-ray diffraction unit used was a RINT 1200 manufactured by Rigaku Company. The unit had a thin film attachment. The X-ray diffraction pattern was determined by the two $\theta$ method using 1° of incident light angle to identify the metal.

2. Amount of the Metal Particles

The amounts of metal particles were determined from the mixture of components by a molar percent conversion. During the reaction process, it was assumed that all the organic components were decomposed and eliminated and that none of the inorganic components were vaporized and eliminated.

3. Particle Size

The particle size was determined by identifying the half value of the main peak of the metal observed in the X-ray diffraction pattern obtained in test 1, above, and then calculating the crystal body size using the Scherres' equation.

4. Structure of the Colored Films and the Comparative Films

The X-ray diffraction pattern obtained in test 1 was analyzed to identify the presence or absence of any diffraction peak other than that of the ultrafine particles. If no diffraction peak existed or if a broad halo was observed, the structure was determined to be an amorphous structure.

5. Transparency of the Colored Films and Comparative Films

The intensity integration for transmitting light in a range of about 400 to about 700 nm was performed by a visible light spectrophotometer using the diffusion reflection method and the permeation method. The ratio of the values obtained from these two methods was calculated and the result was taken as the transparency of the colored film and comparative film.

6. Adhesion of the Colored Films and Comparative Films

The surfaces of the colored films and comparative films were polished using a razor blade. When no discoloration occurred or when no flaw appeared, the colored film or comparative colored film was evaluated as having good adhesion. If other results were observed, the colored film or comparative film was evaluated as having defective adhesion.

7. Chemical Resistance Test

The colored films and comparative films were immersed into an aqueous solution of 3% $H_2SO_4$ or an aqueous solution of 3% NaOH for a time period of 24 hours. When no discoloration occurred, the colored film or comparative film was evaluated as being good. When discoloration occurred, the colored film or comparative film was evaluated as being defective.

The following examples are given by way of illustration and not limitation.

EXAMPLE 1

COLORANT PRODUCED USING VACUUM DEPOSITION

The colorants of EXAMPLES 1-1 to 1-9 described in TABLES 1 and 2, below, are manufactured by first placing five grams (g) of nylon-11 pellets on a tungsten heating element of a vacuum vapor deposition unit. After evacuating the unit to achieve a vacuum of $1\times10^{-5}$ Torr, a voltage was applied to the tungsten heating element to melt the nylon-11. A 5 µm thick polymer layer in a thermodynamically nonequilibrated state was formed on a glass base positioned at the upper part of the set-table at a film forming rate of about 1 µm/min at a high vacuum of $1\times10^{-4}$ to $1\times10^{-5}$ Torr. The molecular weight of the thermodynamically nonequilibrated polymer layer was in the range of about ½ to about 1/10 that of the molecular weight of the nylon-11 pellets.

Next, the vacuum was released, a gold chip was placed on the tungsten heating element, the pressure was reduced in the unit to achieve a vacuum of $1\times10^{-4}$ to $1\times10^{-5}$ Torr and a voltage was applied to the heating element to melt the gold chip. A gold layer was formed on the thermodynamically nonequilibrated polymer layer.

The thermodynamically nonequilibrated polymer layer having the gold layer thereon was removed from the vacuum vapor deposition unit and placed in an oven at a temperature of 120° C. for a time period of ten minutes to produce the polymer compound. The polymer compound contained about 15 wt % gold. The average particle size of the gold was about 5 nm. The polymer compound solution was prepared by mixing the polymer compound with methacresol at a weight ratio of 1:1.

The colorants 1-1 to 1-9 of TABLES 1 and 2 were prepared using the above-described polymer compound solution and the fixing agents, binder resin and glass matrix forming materials described in TABLES 1 and 2. The fixing agent solutions were prepared by mixing the specified fixing agent for a particular colorant with methacresol at a weight ratio of 1:4, respectively. The binder solution was prepared by mixing the binder resin nitrocellulose with carbitol at weight ratio of 1:1.

The colorants were prepared by admixing the polymer compound solution, the fixing agent solution, the binding resin solution and the glass matrix forming materials in a suitable vessel. Each colorant contained 100 weight parts of the polymer compound solution, 90 weight parts of the fixing agent solution, 1000 weight parts of the binder resin solution and 50 weight parts of the glass matrix.

The colorant was used to printed on a glass substrate using the above-described screen printing method. The printed glass substrate was dried at a temperature of 120° C. for ten minutes. The dried glass was placed in an oven at a temperature of 650° C. for ten minutes to produce the reacted colorant. The test results of the reacted colorants are provided in TABLES 1 and 2.

COMPARATIVE EXAMPLE 1

COMPARATIVE COLORING MATERIAL PRODUCED USING VACUUM DEPOSITION

A comparative coloring material was produced using the procedure described above in EXAMPLE 1. However, a glass matrix forming material was not used.

The test results are provided in TABLE 2.

TABLE 1

COMPONENTS AND TEST RESULTS

|  |  | Example 1-1 | Example 1-2 | Example 1-3 | Example 1-4 | Example 1-5 |
|---|---|---|---|---|---|---|
| polymer compound | (C) |  |  |  |  |  |
| polymer | (wt %) | 70 | 70 | 70 | 70 | 70 |
| Au | (wt %) | 30 | 30 | 30 | 30 | 30 |
| particle size of Au | (nm) | 5 | 5 | 5 | 5 | 5 |
| fixing agent | (F) | Al-acetyl acetone salt | Ti-acetyl acetone salt | Fe-acetyl acetone salt | Cu-acetyl acetone salt | Zr-acetyl acetone salt |
| binder resin | (B) | nitrocellulose |  |  |  |  |
| organic solvent |  | carbitol |  |  |  |  |
| glass matrix forming material | (S) | silicon ethoxide |  |  |  |  |
| component | C | 100 | 100 | 100 | 100 | 100 |
| (weight part) | F | 90 | 90 | 90 | 90 | 90 |
|  | B | 1000 | 1000 | 1000 | 1000 | 1000 |
|  | S | 50 | 50 | 50 | 50 | 50 |
| colored film |  |  |  |  |  |  |
| particle size (nm) |  | 12 | 5 | 8 | 8 | 7 |
| density (mol %) |  | 5 | 5 | 5 | 5 | 5 |
| color |  | red | blue | green | pink | blue |
| transparency (%) |  | 99.2 | 99.1 | 99.2 | 99.4 | 99.2 |
| condition of adhesive |  | good | good | good | good | good |
| chemical resistance test |  |  |  |  |  |  |
| acid |  | good | good | good | good | good |
| alkali |  | good | good | good | good | good |
| structure of glass composition |  | amorphous |  |  |  |  |

TABLE 2

COMPONENTS AND TEST RESULTS

|  |  | Example 1-6 | Example 1-7 | Example 1-8 | Example 1-9 | Comparative Example 1-1 |
|---|---|---|---|---|---|---|
| polymer compound | (C) |  |  |  |  |  |
| polymer | (wt %) | 70 | 70 | 70 | 70 | 70 |
| Au | (wt %) | 30 | 30 | 30 | 30 | 30 |
| particle size of Au | (nm) | 5 | 5 | 5 | 5 | 5 |
| fixing agent | (F) | Ti-propoxide | Fe-propoxide | Fe-naphthenate | Fe-naphthenate | Fe-naphthenate |
| binder resin | (B) | nitrocellulose |  |  |  |  |
| organic solvent |  | carbitol |  |  |  |  |
| glass matrix forming material | (S) | silicon ethoxide |  |  | silicone oil | — |
| component | C | 100 | 100 | 100 | 100 | 100 |
| (weight part) | F | 90 | 90 | 90 | 90 | 90 |
|  | B | 1000 | 1000 | 1000 | 1000 | 1000 |
|  | S | 50 | 50 | 50 | 50 | — |
| film |  |  |  |  |  |  |
| particle size (nm) |  | 5 | 5 | 5 | 5 | 5 |
| density (mol %) |  | 5 | 5 | 5 | 5 | 5 |
| color |  | blue | green | green | green | green |
| transparency (%) |  | 99.5 | 99.4 | 99.1 | 99.2 | 99.5 |
| condition of adhesive |  | good | good | good | good | defective |
| chemical resistance test |  |  |  |  |  |  |
| acid |  | good | good | good | good | defective |
| alkali |  | good | good | good | good | good |
| structure of glass composition |  | amorphous |  |  |  |  |

EXAMPLE 2

COLORANT PRODUCED USING GAS CONDENSATION

Ultrafine gold particles were produced by the above-described gas condensation method. A solution was prepared by mixing the gold particles with alpha terpineol and a weight ration of 1:1. Several fixing agents disclosed in TABLES 3 and 4 were used. The liquid fixing agents were used in a nonprocessed state, i.e., they were not admixed with an additional solvent. The solid fixing agents were admixed with m-cresol in a weight ratio of 1:4 to produce fixing agent solutions that were fixed in a nonprocessed state. The binder resin (ethyl cellulose) was admixed with alpha terpineol in a weight ratio of 1:9 to produce the binder resin solution.

The components were admixed together in a suitable vessel to produce the colorants.

Each colorant was printed on a glass substrate using the above-described screen printing method. The printed glass substrate was dried at a temperature of 120° C. for a time period of ten minutes. The dried glass substrate was then heated in a furnace at a temperature of 650° C. for ten minutes to react the colorant. The resulting glass substrate had a transparent colored film thereon. The test results are provided in TABLES 3 and 4.

COMPARATIVE EXAMPLE 2

COMPARATIVE COLORING MATERIAL PRODUCED USING GAS CONDENSATION

A comparative coloring material was prepared in accordance with the procedure described in EXAMPLE 2 except that the comparative coloring material contained no glass matrix forming material. The test results for comparative coloring material are provided in TABLE 4, below.

TABLE 3

COMPONENTS AND TEST RESULTS

| | | Example 2-1 | 2-2 | 2-3 | 2-4 | 2-5 |
|---|---|---|---|---|---|---|
| ultrafine particles | | | | | | |
| dispersed solution | (C) | | | | | |
| solvent | (wt %) | 50 | 50 | 50 | 50 | 50 |
| Au | (wt %) | 50 | 50 | 50 | 50 | 50 |
| density | (mol %) | 8 | 8 | 8 | 8 | 8 |
| fixing agent | (F) | Al-acetyl acetone salt | Ti-acetyl acetone salt | Fe-acetyl acetone salt | Cu-acetyl acetone salt | Zr-acetyl acetone salt |
| binder resin | (B) | ethylcellulose | | | | |
| organic solvent | | α-terpineol | | | | |
| glass matrix forming material | (S) | silicone oil | | | | |
| component | C | 100 | 100 | 100 | 100 | 100 |
| (weight part) | F | 90 | 90 | 90 | 90 | 90 |
| | B | 1000 | 1000 | 1000 | 1000 | 1000 |
| | S | 50 | 50 | 50 | 50 | 50 |
| colored film | | | | | | |
| particle size (nm) | | 12 | 5 | 9 | 10 | 13 |
| density (mol %) | | 20 | 20 | 20 | 20 | 20 |
| color | | red | blue | green | pink | blue |
| transparency (%) | | 99.2 | 99.1 | 99.2 | 99.4 | 99.2 |
| condition of adhesive | | good | good | good | good | good |
| chemical resistance test | | | | | | |
| acid | | good | good | good | good | good |
| alkali | | good | good | good | good | good |
| structure of glass composition | | | | amorphous | | |

TABLE 4

COMPONENTS AND TEST RESULTS

| | | Example | | | | Comparative Example |
|---|---|---|---|---|---|---|
| | | 2-6 | 2-7 | 2-8 | 2-9 | 2-1 |
| ultrafine particles | | | | | | |
| dispersed solution | (C) | | | | | |
| solvent | (wt %) | 50 | 50 | 50 | 50 | 50 |
| Au | (wt %) | 50 | 50 | 50 | 50 | 50 |
| density | (mol %) | 8 | 8 | 8 | 8 | 8 |
| fixing agent | (F) | Ti-propoxide | Fe-propoxide | Fe-naphthenate | | |
| binder resin | (B) | | | ethylcellulose | | |
| organic solvent | | | | α-terpineol | | |
| glass matrix forming material | (S) | | | silicone oil | | |
| component | C | 100 | 100 | 100 | 100 | 100 |
| (weight part) | F | 90 | 90 | 90 | 90 | 90 |
| | B | 1000 | 1000 | 1000 | 1000 | 1000 |
| | S | 50 | 50 | 50 | 50 | — |
| film | | | | | | |
| particle size (nm) | | 5 | 7 | 8 | 9 | 7 |
| density (mol %) | | 20 | 20 | 20 | 20 | 20 |
| color | | blue | green | green | green | green |
| transparency (%) | | 99.5 | 99.4 | 99.1 | 99.2 | 99.5 |
| condition of adhesive | | good | good | good | good | defective |
| chemical resistance test | | | | | | |
| acid | | good | good | good | good | defective |
| alkali | | good | good | good | good | good |
| structure of glass composition | | | | amorphous | | |

The test results indicate that the colorant provides a transparent, brilliant color on the glass surface and produces a mechanically strong colored film that is chemically resistant.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A colorant for providing a transparent colored film, the colorant comprising:

ultrafine metal particles having a particle size of less than about 1000 nanometers;

a fixing agent; and a glass matrix forming material, wherein the metal of the ultrafine metal particles is at least one metal selected from the group consisting of noble metals and metals selected from the group consisting of titanium, vanadium, chromium, manganese, iron, nickel, copper, zinc, cadmium, yttrium, tungsten, tin, germanium, indium and gallium.

2. The colorant of claim 1 wherein the noble metal is selected from the group consisting of gold, platinum, palladium, rhodium and silver.

3. A colorant for providing a transparent colored film, the colorant comprising:

ultrafine metal particles having a particle size of less than about 1000 nanometers;

a fixing agent; and a glass matrix forming material, wherein the fixing agent is an organic metal compound, wherein the organic group of the organic metal compound is selected from the group consisting of alkoxides, organic acid salts and organic materials capable of forming complexes with metal salts.

4. The colorant of claim 3 wherein the metal of the fixing agent is selected from the group consisting of aluminum, titanium, chromium, manganese, iron, cobalt, nickel, copper, yttrium, zirconium, indium, tin, and antimony.

5. A colorant for providing a transparent colored film, the colorant comprising:

ultrafine metal particles having a particle size of less than about 1000 nanometers;

a fixing agent; and a glass matrix forming material, wherein the molar ratio of glass matrix forming material to fixing agent is in the range of about 0.1:1 to about 1000:1.

6. A colorant for providing a transparent colored film, the colorant comprising:

ultrafine metal particles having a particle size of less than about 1000 nanometers;

a fixing agent; and a glass matrix forming material, wherein the fixing agent includes an organic metal compound and the molar ratio of organic metal compound to ultrafine metal particles is at least about 0.1:1.

7. A colorant for providing a transparent colored film, the colorant comprising:

ultrafine metal particles having a particle size of less than about 1000 nanometers;

a fixing agent; and a glass matrix forming material, said colorant further comprising a binder resin dissolved in an organic solvent.

8. The colorant of claim 7 wherein the binder resin is selected from the group consisting of celluloses, poly(meth)acrylates, polyamides, polyesters, polyethers and polyvinyls.

9. A colorant for providing a transparent colored film, the colorant comprising:

ultrafine metal particles having a particle size of less than about 1000 nanometers;

a fixing agent; and a glass matrix forming material, wherein the ultrafine metal particles are gas condensed ultrafine metal particles.

10. A colorant for providing a transparent colored film, the colorant comprising:

ultrafine metal particles having a particle size of less than about 1000 nanometers;

a fixing agent; and a glass matrix forming material, said colorant further comprising a polymer compound wherein the ultrafine metal particles are in a dispersion with the polymer compound.

11. In combination:

a) a colorant for providing a transparent colored film, the colorant comprising:

ultrafine metal particles having a particle size of less than about 1000 nanometers;

a fixing agent; and a glass matrix forming material; and b) a substrate to which the transparent colored film is applied.

12. A colorant for providing a transparent colored film, the colorant comprising:

ultrafine metal particles having a particle size of less than about 1000 nanometers;

a fixing agent; and a glass matrix forming material, said colorant being exposed to an elevated temperature effective to produce a colored film.

13. A colorant for providing a transparent colored film, the colorant comprising a product formed by ultrafine metal particles having a particle size of less than about 1000 nanometers, with a fixing agent and a glass matrix forming material, wherein the molar ratio of the fixing agent to the ultrafine metal particles is at least about 0.1:1.

14. A colorant for providing a transparent colored film, the colorant comprising a product formed by mixing ultrafine metal particles having a particle size of less than about 1000 nanometers, with a fixing agent and a glass matrix forming material, wherein the product is formed by mixing a binder resin dissolved in an organic solvent with the ultrafine metal particles, fixing agent and glass matrix forming material.

15. The colorant of claim 14 wherein the binder resin is selected from the group consisting of celluloses, poly(methyl)acrylates, polyamides, polyesters, polyethers and polyvinyls.

16. A colorant for providing a transparent colored film, the colorant comprising;

ultrafine metal particles having a particle size of less than about 1000 nanometers;

a fixing agent; and a glass matrix forming material, wherein the fixing agent is a complex salt.

17. A colorant for providing a transparent colored film, the colorant comprising:

ultrafine metal particles having a particle size of less than about 1000 nanometers;

a fixing agent; and a glass matrix forming material, wherein the fixing agent is in an organic material in a complex with a metal salt.

18. A colorant for providing a transparent colored film, the colorant comprising a product formed by mixing:

ultrafine metal particles having a particle size of less than about 1000 nanometers, the ultrafine metal particles being selected from the group consisting of gold, platinum, rhodium and silver, titanium, vanadium, chromium, manganese, iron, nickel, copper, zinc, cadmium, yttrium, tungsten, tin, germanium, indium and gallium;

a fixing agent comprising an organic metal compound wherein the organic group of the organic metal compound is selected from the group consisting of alkoxides, organic acid salts and organic materials capable of forming complexes with metal salts; and a glass matrix forming material comprising an organic compound that contains an element selected from the group consisting of silicon, boron and phosphorus, wherein the metal of the organic metal compound fixing agent is selected from the group consisting of aluminum, titanium, chromium, manganese, iron, cobalt, nickel, copper, yttrium, zirconium, indium, tin, and antimony.

* * * * *